(No Model.)
T. SCHMITZ.
FORK.
No. 350,605. Patented Oct. 12, 1886.
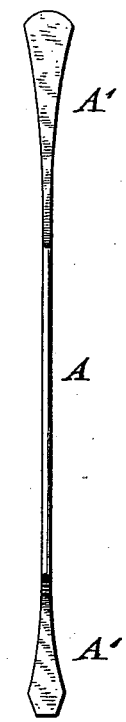
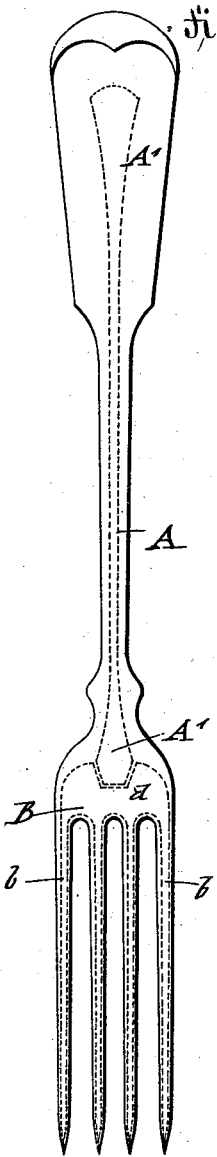
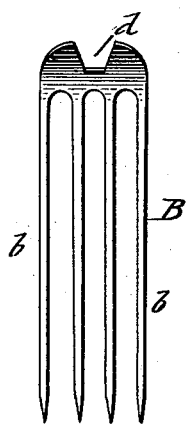
WITNESSES:
INVENTOR
Theodore Schmitz
BY
ATTORNEYS.

UNITED STATES PATENT OFFICE.

THEODORE SCHMITZ, OF NEW YORK, N. Y.

FORK.

SPECIFICATION forming part of Letters Patent No. 350,605, dated October 12, 1886.

Application filed February 26, 1886. Serial No. 193,272. (No model.)

*To all whom it may concern:*

Be it known that I, THEODORE SCHMITZ, of the city, county, and State of New York, have invented certain new and useful Improvements in Forks, of which the following is a specification.

This invention has reference to an improvement in the manufacture of forks from tin and alloys of tin, whereby the handles and tines are considerably strengthened; and the invention consists of a fork the handle of which is strengthened by a wire shank having flattened ends, said shank extending from the tip of the handle down below the point of connection of the handle with the head of the tines, which latter are re-enforced by a metallic frame having as many prongs as there are tines, and a recess in the upper part or head for the lower end of the re-enforcing wire shank.

In the accompanying drawings, Figure 1 represents a vertical longitudinal section of my improved fork. Fig. 2 is a front elevation of the same. Fig. 3 is a detail front view of the wire shank for re-enforcing the handle of the fork, and Fig. 4 a detail front view of the frame for re-enforcing the tines of the fork.

Similar letters of reference indicate corresponding parts.

In making the forks according to my invention a tinned-wire shank, A, having flattened ends A', is placed into the mold, said shank extending from below the connection of the handle with the tines, the shank being so curved as to correspond to the curvature of the handle. The flattened ends of the wire shank A strengthen the tip of the handle and the point of connection of the handle with the tines.

To re-enforce the tines, a frame, B, having as many round-pointed prongs $b\ b$ as there are tines, is placed into the mold. The upper end or head of the frame B is recessed at $d$, so as to provide the required space for the lower tapering end, A', of the wire shank A, as shown in dotted lines in Fig. 2. The wire shank A and the re-enforcing frame B of the tines impart strength and durability to the handle and tines, so as to prevent the breaking of the handle at its point of connection with the head of the tines, or the breaking of the individual tines. The prongs of the re-enforcing frame of the tines also impart elasticity to the tines, so that they cannot be bent sidewise out of place when in use.

I am aware that it is old to re-enforce the handles of spoons and forks with a wire shank, around which the metal of the fork is cast, and I therefore do not claim this, broadly. In my invention, however, the re-enforcing wire shank extends from the tip of the handle below its point of connection with the head of the tines and from said head to the tips of the tines whereby the strength and durability of the fork are considerably increased with little increase in the expense of the same.

Having thus described my invention, I claim as new and desire to secure by Letters Patent—

1. A metallic fork the handle and tines of which are re-enforced, respectively, by a wire shank having enlarged and flattened ends and by a metallic frame having as many pointed prongs as there are tines, substantially as set forth.

2. A metallic fork the handle and tines of which are re-enforced, respectively, by a wire shank having enlarged and flattened ends and by a metallic frame having as many pointed prongs as there are tines, the lower end of the shank being extended into the recessed head of the re-enforcing frame of the tines, substantially as set forth.

In testimony that I claim the foregoing as my invention I have signed my name in presence of two subscribing witnesses.

THEODORE SCHMITZ.

Witnesses:
 PAUL GOEPEL,
 SIDNEY MANN.